April 22, 1958 G. W. PLICE 2,831,936
HIGH FREQUENCY VIBRATOR OR THE LIKE
Filed Feb. 14, 1956 2 Sheets-Sheet 2
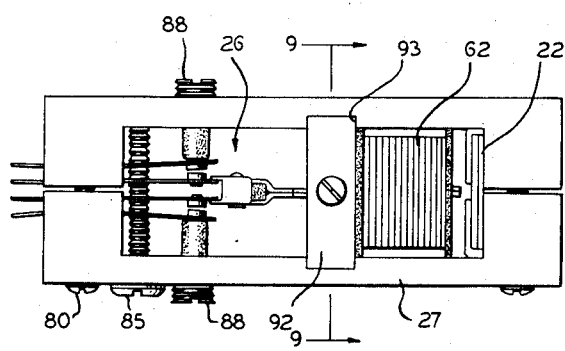
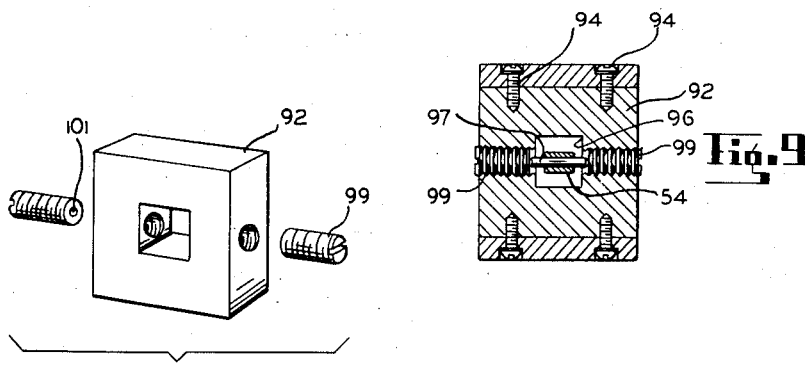
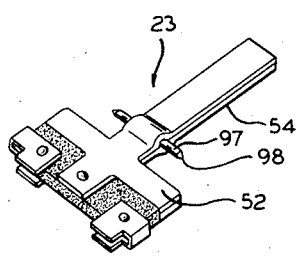
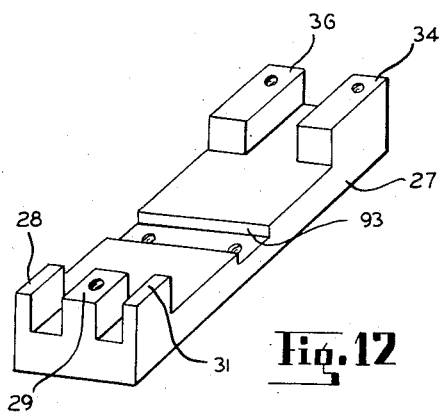
*INVENTOR.*
GERALD W. PLICE
BY
*Foley & Lindberg*
ATTORNEYS the principles thereof. Other embodiments may be sug-

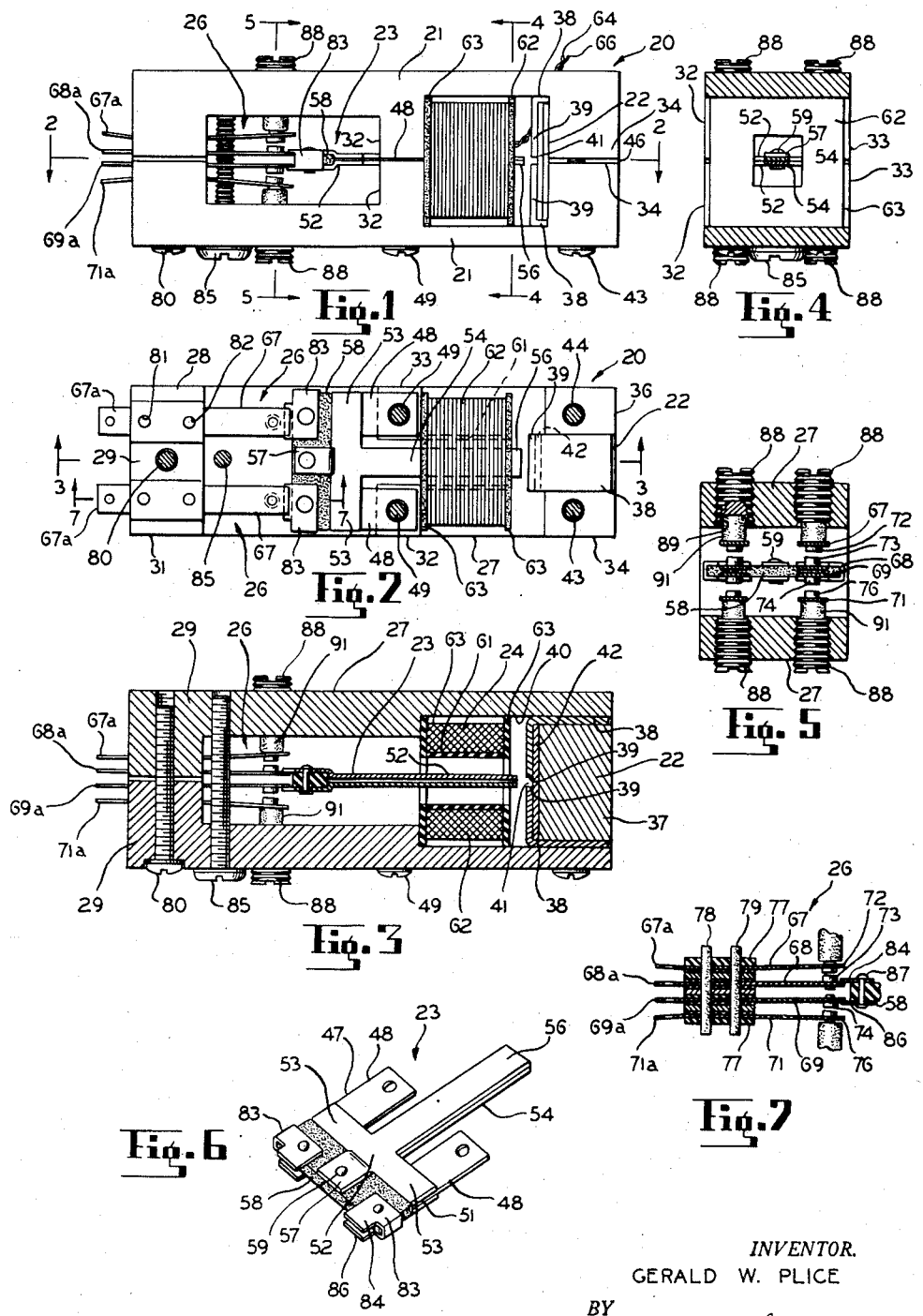

United States Patent Office 2,831,936
Patented Apr. 22, 1958

2,831,936

HIGH FREQUENCY VIBRATOR OR THE LIKE

Gerald W. Plice, Morton Grove, Ill., assignor to James Vibrapowr Co., a corporation of Illinois Application February 14, 1956, Serial No. 565,459

7 Claims. (Cl. 200—90)

This invention relates to high frequency vibrating devices, such as a high frequency vibrator, chopper or the like.

One application of a device according to the present invention is that of interrupting a voltage of extremely small magnitude for the subsequent amplification thereof to values which can be used for measurement or control. Such devices have become known in the art as choppers.

One of the problems attendant upon the use of the choppers according to the prior art has been that of driving the voltage interrupting means at a rate suitable to differentiate the voltage of an aperiodic voltage wave. In order to differentiate such wave accurately the voltage interrupting means must be driven at a frequency which is greater than the frequency of any periodic portions of the aperiodic voltage wave. Transient voltages (noise level for example), and the inherent resonance of the voltage interrupting means have also prevented accurate measurement of the voltage.

With the foregoing considerations in mind it is a principal object of this invention to provide a high frequency vibrating device having a natural resonant frequency considerably removed from the normal driving frequencies, so that the measurement of a signal voltage will not be affected.

Another object is to provide a high frequency vibrator or chopper and to provide in such a chopper a structure wherein transient voltages are substantially nullified or exist at an extremely low level, by means of a short circuiting loop made as a part of the structure.

Another object is to employ a voltage interrupting means which is mounted in a substantially balanced manner.

Yet another object comprehends the provision of a structure which will isolate the driving coil and magnetic structure for the voltage interrupting means from contacts in circuit with the interrupted voltage, such structure also affording a means for supporting the voltage interrupting means.

Still another object is to provide in a chopper a frame consisting of confronting portions which serve to support a contact assembly, interrupting means for the contact assembly, and driving means for the interrupting means, such confronting portions also serving as part of a structure to isolate and short circuit transient voltages from the contact assembly.

Another object is to provide in a vibrator or chopper structure means whereby the contact assemblies may readily be adapted for make before break operation, or break before make operation as desired.

Other objects and important features of the invention will be apparent from a study of the specification following taken with the drawings which together show a number of preferred embodiments of the invention and what are now considered to be the best modes of practicing the principles thereof. Other embodiments may be suggested to those having the benefit of the teachings herein, and such other embodiments are intended to be reserved especially as they fall within the scope and purview of the subjoined claims.

In the drawings:

Fig. 1 is a front elevational view of one form of a high frequency vibrator or chopper having the improvements according to the present invention embodied therein;

Fig. 2 is a section taken along the line 2—2 of Fig. 1 looking in the direction of the arrows;

Fig. 3 is a vertical sectional view taken along the line 3—3 of Fig. 2 looking in the direction of the arrows;

Fig. 4 is a sectional view taken along the line 4—4 of Fig. 1 looking in the direction of the arrows;

Fig. 5 is a sectional view taken along the line 5—5 of Fig. 1 looking in the direction of the arrows;

Fig. 6 is a perspective view showing details of a reed supported vibrating armature seen in Figs. 1 to 5;

Fig. 7 is a section taken through a contact assembly of the structure shown in Figs. 1 to 5 inclusive, said view being taken along the line 7—7 of Fig. 2 and looking in the direction of the arrows;

Fig. 8 is a front elevational view of another embodiment of a high frequency vibrator or chopper according to the present invention;

Fig. 9 is a transverse section taken along the line 9—9 of Fig. 8 looking in the direction of the arrows;

Fig. 10 is a perspective view of a pillow block for supporting the vibrating armature of the chopper seen in Fig. 8;

Fig. 11 is a perspective view of the vibrating armature supported in the pillow block of Fig. 10; and Fig. 12 is a perspective view of a portion of one of the confronting frame structures employed in the vibrator or chopper according to Fig. 8.

Referring now to Figs. 1 to 7 of the drawings, the improved vibrator or chopper according to the present invention is referred to generally by the reference numeral 20. Such a vibrator consists generally of confronting frame structures 21, 21, a uni-directional magnetic field structure 22, a vibrating armature 23, a driving coil winding 24 therefor, and a pair of contact assemblies 26.

The frame structures 21, 21 as seen in Figs. 1 and 2 are symmetrical and are in confronting relationship. Each frame structure 21 consists of a side rail 27 having at one end thereof spaced confronting bosses 28, 29 and 31 for supporting and locating the contact assemblies 26, and centrally disposed confronting bosses 32 and 33 forming a means for supporting the vibrating armature 23. The other end of each frame structure 21 includes spaced confronting end bosses 34 and 36 for positioning the uni-directional magnetic field structure 22.

The magnet structure 22 consists of a cast piece of high retentivity magnet material 37, such as Alnico or the like, which is flanked on each side by L-shaped pole pieces 38, 38, the pole pieces 38 being spaced from each other at pole tips 39, 39 as seen in Fig. 3 to provide a magnetic gap 41 of high field strength. A spacer plate 42 is maintained between the pole pieces 39, 39 of the pole pieces 38 and the cast piece of magnet material 37.

The magnetic assembly thus far described is maintained in position by the frame members 21, 21 and between the confronting bosses 34 and 36 by means of cap screws 43 and 44 which are tapped into the bosses 34 on each side of the magnet structure 22 to clamp the magnet structure 22 in the manner shown. It may be noted that the bosses 34 and 36 are separated a slight amount as at 46 to insure good clamping pressure against the magnet structure 22 by the rails 27, 27.

Referring now to Fig. 6 particularly the vibrating armature 23 consists of a U-shaped reed 47 having spaced arms 48 which are anchored between the confronting bosses 33, 32 by means of screws 49 tapped into such bosses. The arms 48 are spanned by a member 51 which has spot welded thereto on each side thereof a reed weight 52 at spot welds 53. The reed weight 52 is in the shape of a cross as shown, and each longer leg 54 thereof is spot welded together at its end 56. The shorter legs 57 of the reed weight hold therebetween an insulating member 58 made preferably of silicone impregnated fiberglass. A rivet 59 passes through the insulating member 58 and the shorter legs 57 to hold the assembly together.

The legs 54 extend between the bosses 32, 33 as seen in Fig. 2 and into a hollow bobbin 61 of a driving coil 62 having rectangular end flanges 63 held in position between confronting innerfaces 40 of the side rails 27. The legs 54 extend through the hollow bobbin 61 into close proximity to the magnetic gap 51 at the pole faces 39, 39 of the permanent magnet 37. The driving coil 62 is connected to leads 64 and 66 to a suitable source of voltage at a desired frequency.

As is well known in the art, an alternating voltage across the leads 64, 66 will change the polarity of the armature 52 to cause it to vibrate in the presence of the permanent magnet field in the gap 41 at the pole faces 39, 39, during such vibration the armature 52 being supported by the reed arms 48 anchored to the bosses 32, 33.

The vibrating armature 52 is arranged to cause interruption of one or more circuits at the contact assembly 26. Such a contact assembly includes contact arms 67, 68, 69 and 71 contacts 67 and 68 carrying contacts 72 and 73 respectively at the ends thereof, and contact arms 69 and 71 carrying contacts 74 and 76 respectively at the ends thereof. The contact arms 67, 68, 69 and 71 are electrically isolated from each other by leaves of insulating material 77, the contact arms and the insulating leaves being joined together as a stack as seen in Fig. 7 by means of insulating dowels 78 and 79.

The contact arms 67, 68, 69 and 71 extend beyond the stack seen as at 67a, 68a, 69a and 71a for connection thereat to any circuit desired to be interrupted.

The dowels 78 and 79 extend beyond the outermost of the insulating leaves 77 and are arranged to be aligned properly in recesses 81 and 82 respectively in each frame 21. It will be noted that each such contact assembly is thus held firmly between bosses 28 and 29 and bosses 29 and 31 as seen in Fig. 2 by means of screws 80 and 85. Screw 80 is tapped into one of the bosses 29 between each contact assembly 26 while screw 85 is tapped into the side rail 27 between each contact assembly 26.

Means are provided for alternately opening and closing the circuit made through contacts 72 and 73 and contacts 74 and 76 upon vibration of the armature 52. As seen in Fig. 6 each end of the insulating member 58 is provided with a fork 83 having spaced tines 84 and 86, the fork 83 being held in position on the insulating member 58 by means of a rivet 87 passing therethrough, as seen also in Fig. 7.

The position of the outermost contacts 72 and 76 with respect to their cooperating contacts 73 and 74 is adjusted by means of adjusting set screws 88 tapped into the side rails 27, as seen also in Fig. 5. Each set screw 88 has a recess 89 to receive a cylindrical shaped insulator 91 which contacts the contact arm 67 and 71.

As seen in Fig. 7 the ends of the contact arms 68 and 69 are engaged by the tines 84 and 86. When a driving voltage is impressed across the terminals 64 and 66, the armature 52 will be caused to vibrate in synchronism with the driving voltage, causing the contact arms 84 and 86 to vibrate therewith to open and close their cooperating contacts alternately. Appropriate circuity may be connected to the contact arms 67, 68, 69 and 71 to develop a "chopped" voltage as desired.

It will be seen that the fixed contact arms 67 and 71 may be adjusted so as to cooperate with the moving contact arms 68 and 69, so that the assembly will operate upon vibration of the armature with a "make before break" or a "break before make" function as desired. By suitably spacing the magnetic gap 41 with respect to the thickness of the armature leaves 54 the armature can occupy a "null" position with both sets of contacts either closed or open, as desired.

Referring now to Figs. 8 to 12 of the drawings, there is shown another embodiment of the invention in which the vibrating armature is supported upon bearings, which may be jeweled if desired to give a vibrating structure having a low natural resonant frequency, or in any event a resonant frequency well below the frequency of the voltage impressed across the driving coil 62. The structure shown with respect to Figs. 8 to 12 inclusive is identical to that shown with respect to Figs. 1 to 7 inclusive with the exception of the means for supporting the vibrating reed structure or armature.

As seen in Fig. 8, the confronting bosses 32 and 33 are supplanted by a pillow block 92 which is held in a milled slot 93 formed in the rails 27. The pillow block 92 is held in position by means of countersunk screws 94 as seen in Fig. 9. The pillow block 92 has an aperture 96 therein for the leg 54 of the armature 52.

As seen in Fig. 11 the legs 54 of the armature 52 are crimped around a shaft 97, each end of which terminates in a conical shaped journal 98. The pillow block 92 supports journal bearings 99 which are threaded thereinto, the inner ends of the bearings being preferably fitted with a jewel 101 receiving the conical journal 98.

It may be noted that in either of the embodiments shown the mass of the vibrating armature is substantially equally distributed on each side of its pivot point. For example, in the embodiment shown with respect to Figs. 1 to 7 inclusive the mass of the double arms 54 to one side of the confronting bosses 32, 33 supporting the reeds 48, 48 is equal to the mass to the other side thereof. Armature elements 52, 57, the insulating member 58 and the forks 83 may be considered as having a mass substantially equal to the mass of the legs 54.

By distributing the mass equally as described, the entire vibrating assembly becomes less sensitive to external acceleration forces in directions parallel to the plane of armature vibration.

In assembling the structure according to either embodiment of the invention the position of the end 56 of the vibrating armature 54 with respect to the pole faces 39 can be adjusted by merely placing a feeler gauge between the end 56 of the armature and the two pole pieces 39 of the magnet structure, the entire magnet structure consisting of the pole pieces 39, spacer 42 and magnet 37 being readily moved to the proper position between the confronting bosses 34 and 36 and the locking screws 43 tightened.

Structure according to either form of the invention can be controlled so that its frequency is fairly constant for a given production run. By holding the natural resonant frequency within small limits it is possible to employ driving frequencies which are removed from the natural resonant frenquency or any harmonics thereof.

The provision of the symmetrical frame structure with the confronting bosses provides a means of short circuiting transient voltages. The confronting bosses 32 and 33, the side rails 27 and the confronting end bosses 34 and 36 all provide a short circuiting loop isolating the coil 62 and the magnetic structure 22 from the contact assembly 26. Likewise the confronting bosses 32 and 33, side rails 27 and end confronting bosses 28, 29 and 31 form a short circuiting loop effectively shielding the contact assembly 26 against transient voltages.

It will be noted that the vibrating structure is electrically insulated and that the circuit interruption is accomplished by a vibrating member whose induced voltages do not effect the switching contacts.

While the invention has been described in terms of embodiments where a double pole, double throw circuit interrupting functions can be effected, it is apparent that the structure according to the invention can be modified for single pole, double throw circuit interrupting functions.

The scope of the invention is intended to be limited only by the claims here appended.

I claim as my invention:

1. In a device of the class described, a pair of frame members, a vibrating armature extending lengthwise of said frame members, said frame members being in confronting relationship with means disposed substantially midway of the length thereof for supporting said vibrating armature, spaced confronting extensions at one end of said spaced frame members, means forming a magnetic field supported between said spaced confronting extensions, means supported between said first named means and confronting extension and coacting with said means for forming a magnetic field to cause lateral vibration of said armature, said first named means and said frame members and said confronting frame extensions forming a short circuiting path for transient voltages, confronting frame extensions at the other end of said frame members, a contact arm assembly supported at said last named confronting frame extensions and extending between said frame members, means supported by said vibrating armature for operating said contact arm assembly; said first named means, said frame members and said last named confronting frame extensions forming an additional short circuiting path for transient voltage and insulating means supported by said armature and isolating said contact operating means, said contact operating means being wholly enclosed within said additional short circuiting path whereby transient voltages in said armature will not appear at said contact assembly.

2. In a device of the class described, a pair of frame members, a vibrating armature extending lengthwise of said frame members, said frame members being in confronting relationship with means disposed substantially midway of the length thereof for supporting said vibrating armature, means forming a magnetic field supported between said spaced frame members, means supported between said frame members and coacting with said means for forming a magnetic field to cause lateral vibration of said armature, confronting extensions at the other end of said frame members, a contact arm assembly supported at said last confronting frame extensions and extending between said frame members, means supported by said vibrating armature for operating said contact arm assembly, said first named means, said frame members and said confronting frame extensions forming short circuiting loops for transient voltages, and insulating means supported by said armature isolating said contact operating means from said armature, said contact operating means being wholly enclosed within one of said short circuiting loops whereby transient voltages in said armature will not appear at said contact assembly.

3. In a device of the class described, a pair of frame members, a vibrating armature extending lengthwise of said frame members, said frame members being in confronting relationship with extensions therefrom substantially midway of the length thereof in confronting relationship for supporting said vibrating armature, spaced confronting extensions at one end of said spaced frame members, means forming a magnetic field supported between said spaced confronting extensions, means supported between said first named extensions and said last named confronting extensions and coacting with said means for forming a magnetic field to cause lateral vibration of said armature, said confronting extensions at the midway point on said frame members and the confronting extensions at the end of said frame members forming a short-circuiting loop for transient voltages, a contact assembly supported at the other end of said spaced frame members and coacting with said vibrating armature, said contact assembly being disposed between said frame members, insulating means supported by said armature, and contact operating means insulated from said armature thereby, said contact operating means being wholly enclosed within said short circuiting loop whereby transient voltages induced in said vibrating armature will not appear at said contact assembly.

4. In a device of the class described, a pair of frame members, a vibrating armature extending lengthwise of said frame members, said frame members being in confronting relationship with means disposed substantially midway of the length thereof for supporting said vibrating armature, spaced confronting extensions at one end of said spaced frame members, means forming a magnetic field supported between said spaced confronting extensions, means supported between said first named means and said confronting extensions and coacting with said means for forming a magnetic field to cause lateral vibration of said armature, insulating means carried at the end of said vibrating armature remote from the aforesaid magnetic field, contact arm engaging members supported by said insulating means, and contact arms supported at the other end of said spaced frame members and coacting with said vibrating armature at the contact arm engaging members, said contact arms extending between said frame members, whereby said contact arms and said contact arm engaging members are wholly enclosed within a short circuiting loop including said confronting midway means and said frame members whereby transient voltage induced in said vibrating armature will not appear at said contact arms and said contact arm engaging members.

5. In a device of the class described, a pair of frame members, a vibrating armature extending lengthwise of said frame members, said frame members being in confronting relationship with means disposed substantially midway of the length thereof for supporting said vibrating armature, spaced confronting extensions at one end of said spaced frame members, means forming a magnetic field supported between said spaced confronting extensions, means supported between said first named means and said confronting extensions and coacting with said means for forming a magnetic field to cause lateral vibration of said armature, confronting extensions at the other end of said frame members, contacts supported at the other end of said spaced frame members and coacting with said vibrating armature, said contacts being disposed between said frame members, said first named means and said last named confronting extensions forming a short circuiting loop for transient voltages, and means carried by said vibrating armature and insulated therefrom and wholly enclosed within said last named short circuiting loop for operating said contacts whereby transient voltages induced in said vibrating armature will not appear at said contacts.

6. In apparatus of class described, a pair of frame members, confronting extensions on each frame disposed at each end and substantially centrally thereof, a vibrating armature supported by said central confronting extensions and extending lengthwise of said frame members, means forming a magnetic field supported at one end of said frame members by the confronting extensions thereat, means providing a varying magnetic field disposed between said central extensions and said extensions at said end of said frame for causing vibration of said armature, said central extensions and said end extensions forming a short circuiting path for transient voltages, a contact assembly at the other end of said frame members and supported by the confronting extensions thereat, said contact assembly being disposed between said frame members, means supported by said vibrating armature for operating said contact assembly, said central extensions and the extensions at the said other end of said frame members forming an additional short circuiting path for transient voltages, and means insulating said contact operating means from said armature, said contact operating means being wholly enclosed within the additional short circuiting path whereby transient voltages in said armature will not appear at said contact assembly.

7. In apparatus of class described, a pair of frame members, confronting extensions on each frame disposed at each end and substantially centrally thereof, a vibrating armature supported by said central confronting extensions and extending lengthwise of said frame members, means forming a magnetic field supported at one end of said frame members by the confronting evtensions thereat, means providing a varying magnetic field disposed between said central extensions and said extensions at said end of said frame for causing vibration of said armature, said central extensions and said end extensions forming a short circuiting path for transient voltages, a contact assembly at the other end of said frame members and means supported by said vibrating armature for operating said contact assembly, said central extensions and the extensions at the said other end of said frame members forming an additional short circuiting path for transient voltages, and means insulating said contact operating means from said armature, said contact operating means being wholly enclosed within the central extensions and the said other extensions of said frame members whereby transient voltages in said armature will not appear at said contact assembly.

References Cited in the file of this patent

UNITED STATES PATENTS

| | | |
|---|---|---|
| 55,541 | Rudd | June 12, 1866 |
| 531,188 | Howe | Dec. 18, 1894 |
| 1,763,003 | Mead | June 10, 1930 |
| 2,296,684 | Neurer | Sept. 22, 1942 |
| 2,427,990 | Coake | Sept. 23, 1947 |
| 2,433,740 | Collins et al. | Dec. 30, 1947 |
| 2,443,784 | Bullen et al. | June 22, 1948 |
| 2,486,394 | Eannarino | Nov. 1, 1949 |
| 2,698,366 | Howell | Dec. 28, 1954 |
| 2,702,841 | Bernstein | Feb. 22, 1955 |
| 2,718,570 | Caldwell | Sept. 20, 1955 |
| 2,719,891 | James et al. | Oct. 4, 1955 |